(12) United States Patent
Sundnes

(10) Patent No.: US 8,069,494 B2
(45) Date of Patent: Dec. 6, 2011

(54) PUNCTURE AND CUT RESISTANT MATERIAL

(76) Inventor: John Sundnes, Los Angeles, CA (US)

( * ) Notice: Subject to any disclaimer, the term of this patent is extended or adjusted under 35 U.S.C. 154(b) by 0 days.

(21) Appl. No.: 12/160,351

(22) PCT Filed: Dec. 21, 2006

(86) PCT No.: PCT/US2006/062525
§ 371 (c)(1),
(2), (4) Date: Jul. 9, 2008

(87) PCT Pub. No.: WO2007/111753
PCT Pub. Date: Oct. 4, 2007

(65) Prior Publication Data
US 2008/0289087 A1    Nov. 27, 2008

Related U.S. Application Data

(60) Provisional application No. 60/766,291, filed on Jan. 9, 2006, provisional application No. 60/823,369, filed on Aug. 23, 2006.

(51) Int. Cl.
*F41H 1/02* (2006.01)
*F41H 5/02* (2006.01)
*F41H 13/00* (2006.01)

(52) U.S. Cl. .......................... 2/2.5; 89/36.05
(58) Field of Classification Search .................. 2/2.5
See application file for complete search history.

(56) References Cited

U.S. PATENT DOCUMENTS

| | | | | |
|---|---|---|---|---|
| 1,495,489 A | * | 5/1924 | Krause | 2/2.5 |
| 1,513,766 A | * | 11/1924 | Spooner | 428/121 |
| 2,640,987 A | * | 6/1953 | Ehlers | 2/2.5 |
| 2,749,551 A | | 6/1956 | Garbellano | |
| 2,771,384 A | * | 11/1956 | Collins | 428/117 |
| 2,819,759 A | | 1/1958 | Goodloe | |
| 2,981,954 A | | 5/1961 | Garbellano | |
| 3,284,806 A | | 11/1966 | Prasser | |
| 3,398,406 A | | 8/1968 | Waterbury | |
| 3,452,362 A | * | 7/1969 | Korolick et al. | 2/2.5 |
| 3,557,384 A | * | 1/1971 | Barron et al. | 2/2.5 |
| 3,562,810 A | * | 2/1971 | Davis | 2/2.5 |
| 3,567,568 A | * | 3/1971 | Windecker | 442/224 |
| 3,813,281 A | | 5/1974 | Burgess et al. | |
| 4,079,464 A | * | 3/1978 | Roggin | 2/2.5 |
| 4,198,707 A | * | 4/1980 | Haupt et al. | 2/2.5 |
| 4,356,569 A | | 11/1982 | Sullivan | |
| 4,413,357 A | * | 11/1983 | Sacks | 2/2.5 |
| 4,453,271 A | * | 6/1984 | Donzis | 2/456 |
| 4,526,828 A | | 7/1985 | Fogt et al. | |

(Continued)

FOREIGN PATENT DOCUMENTS

FR    2819151    7/2002

*Primary Examiner* — Bobby Muromoto, Jr.
(74) *Attorney, Agent, or Firm* — Roy L Anderson; Wagner, Anderson & Bright, P.C.

(57) ABSTRACT

The invention is a garment that is made from an elastic and puncture resistant material that provides protection to the wearer against shark attacks. The garment includes at least one elastic base layer, a plurality of protective elements that overlap each other to form a protective layer, and a fabric layer to join the elastic material and the protective element against each other. The protective elements are rigid, but configured in such a way to maintain flexibility in the overall garment.

19 Claims, 8 Drawing Sheets

U.S. PATENT DOCUMENTS

| | | | |
|---|---|---|---|
| 4,602,384 A | 7/1986 | Schneider | |
| 4,602,385 A * | 7/1986 | Warren | 2/2.14 |
| 4,608,716 A * | 9/1986 | Brumfield | 2/2.5 |
| 4,633,756 A * | 1/1987 | Rudoi | 89/36.02 |
| 4,680,812 A * | 7/1987 | Weigl | 2/467 |
| 4,710,978 A | 12/1987 | Pankopf | |
| 4,742,578 A | 5/1988 | Seid | |
| 4,779,290 A | 10/1988 | Welch et al. | |
| 4,833,729 A | 5/1989 | Fox et al. | |
| 4,833,733 A | 5/1989 | Welch et al. | |
| 4,884,295 A * | 12/1989 | Cox | 2/467 |
| 4,917,372 A * | 4/1990 | Zeitlin | 2/2.5 |
| 4,951,689 A | 8/1990 | Jones | |
| 5,020,157 A * | 6/1991 | Dyer | 2/2.5 |
| 5,070,540 A | 12/1991 | Bettcher et al. | |
| 5,124,195 A * | 6/1992 | Harpell et al. | 428/152 |
| 5,175,040 A * | 12/1992 | Harpell et al. | 428/113 |
| 5,200,263 A * | 4/1993 | Gould et al. | 428/323 |
| 5,220,691 A * | 6/1993 | Wiegers | 2/24 |
| 5,325,537 A * | 7/1994 | Marion | 2/462 |
| 5,362,527 A * | 11/1994 | Harpell et al. | 428/33 |
| 5,368,930 A | 11/1994 | Samples | |
| 5,407,612 A * | 4/1995 | Gould et al. | 264/496 |
| 5,437,905 A * | 8/1995 | Park | 428/105 |
| 5,443,882 A * | 8/1995 | Park | 428/103 |
| 5,443,883 A * | 8/1995 | Park | 428/103 |
| 5,483,705 A * | 1/1996 | DiMatteo | 2/466 |
| 5,511,241 A | 4/1996 | Ziegler | |
| 5,514,241 A * | 5/1996 | Gould et al. | 156/261 |
| 5,515,541 A | 5/1996 | Sacks et al. | |
| 5,547,536 A * | 8/1996 | Park | 156/292 |
| 5,601,895 A | 2/1997 | Cunningham | |
| 5,635,288 A * | 6/1997 | Park | 428/105 |
| 5,636,377 A * | 6/1997 | Wiener | 2/465 |
| 5,660,572 A | 8/1997 | Buck | |
| 5,738,925 A * | 4/1998 | Chaput | 428/101 |
| 5,853,863 A | 12/1998 | Kim | |
| 5,906,873 A | 5/1999 | Kim | |
| 5,935,678 A * | 8/1999 | Park | 428/105 |
| 5,943,694 A * | 8/1999 | Moureaux et al. | 2/2.5 |
| 5,953,751 A | 9/1999 | Kobren | |
| 5,996,115 A * | 12/1999 | Mazelsky | 2/2.5 |
| 6,119,575 A * | 9/2000 | Dragone et al. | 89/36.05 |
| 6,127,291 A * | 10/2000 | Coppage et al. | 442/135 |
| 6,159,590 A | 12/2000 | Kim | |
| 6,233,737 B1 * | 5/2001 | Ditchfield et al. | 2/2.5 |
| 6,266,818 B1 * | 7/2001 | Howland et al. | 2/2.5 |
| 6,389,594 B1 * | 5/2002 | Yavin | 2/2.5 |
| 6,519,774 B2 | 2/2003 | Mitchell | |
| 6,543,055 B2 * | 4/2003 | Howland et al. | 2/2.5 |
| 6,562,435 B1 * | 5/2003 | Brillhart et al. | 428/105 |
| 6,892,392 B2 * | 5/2005 | Crye et al. | 2/2.5 |
| 6,949,280 B2 * | 9/2005 | Brillhart et al. | 428/105 |
| 6,961,957 B2 * | 11/2005 | Carlson | 2/2.5 |
| 6,961,958 B1 * | 11/2005 | Seitzinger | 2/2.5 |
| 6,962,739 B1 * | 11/2005 | Kim et al. | 428/47 |
| 7,093,301 B1 * | 8/2006 | Moore, Jr. | 2/2.5 |
| 7,150,217 B2 * | 12/2006 | Kershaw | 89/36.05 |
| 2001/0029621 A1 * | 10/2001 | Howland et al. | 2/2.5 |
| 2005/0010987 A1 * | 1/2005 | Crye et al. | 2/2.5 |
| 2008/0289087 A1 * | 11/2008 | Sundnes | 2/456 |

* cited by examiner

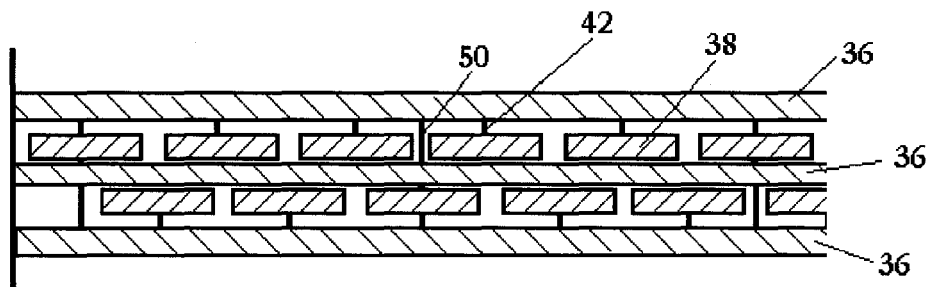
Fig. 5a
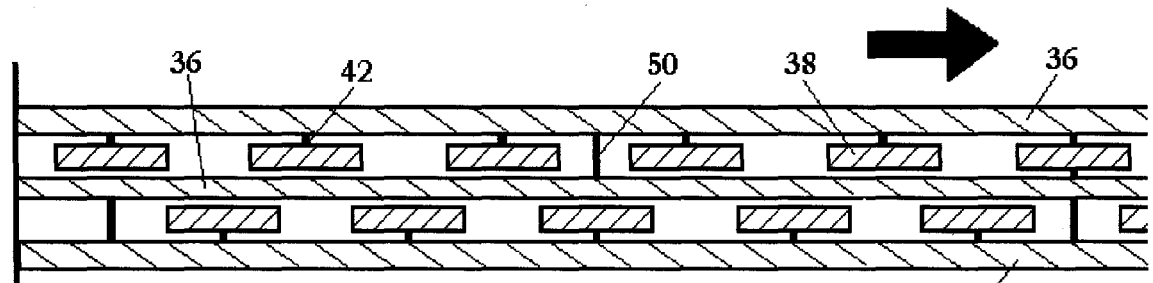
Fig. 5b
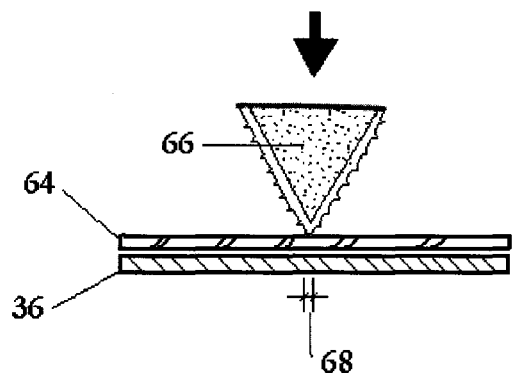 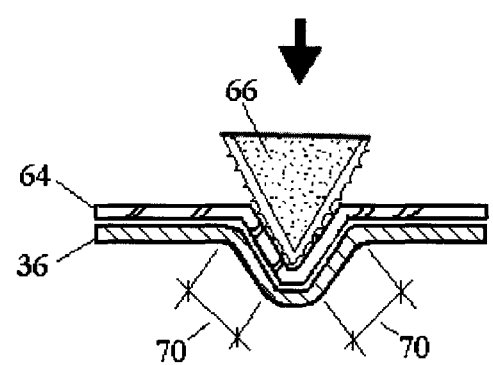
Fig. 6a            Fig. 6b

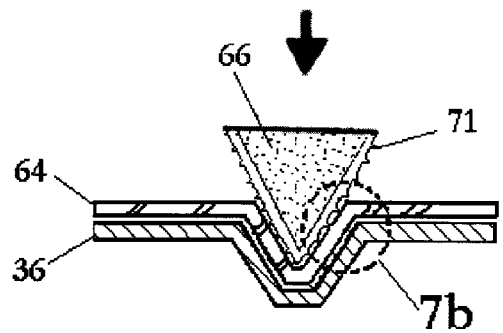
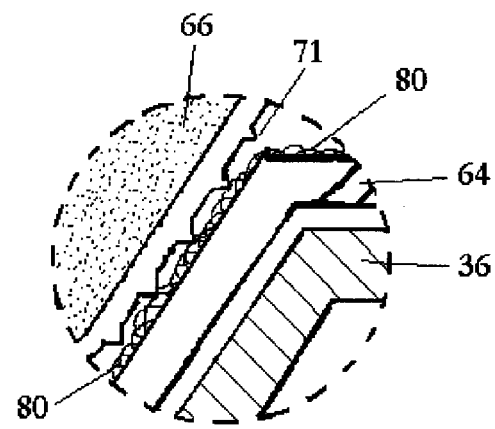
Fig. 7a  Fig. 7b
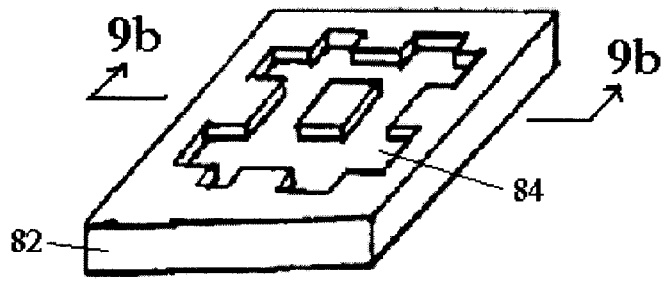
Fig. 9a  Fig. 9b
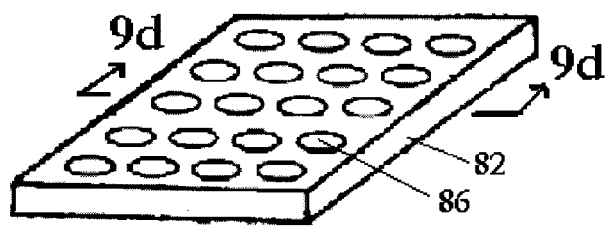
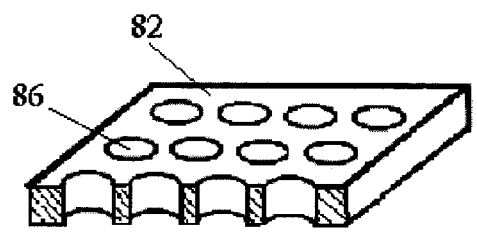
Fig. 9c  Fig. 9d

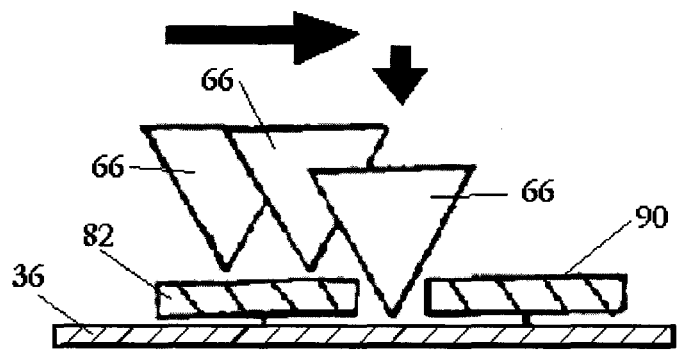
Fig. 10a
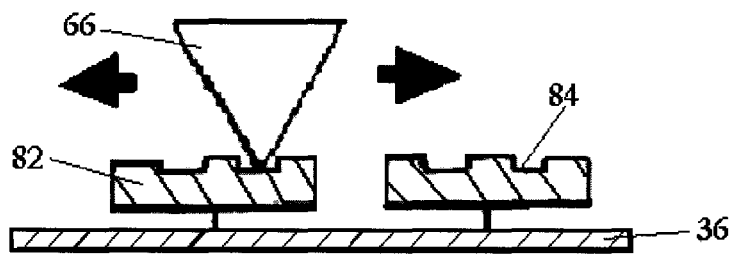
Fig. 10b
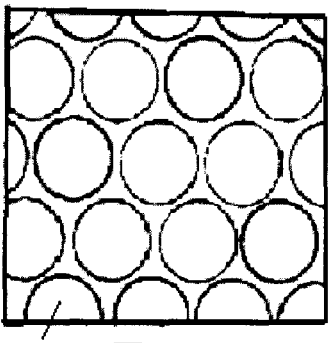
92 Fig. 11a
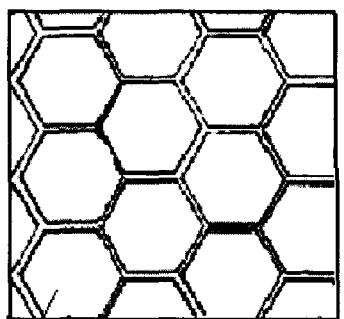
96 Fig. 11c
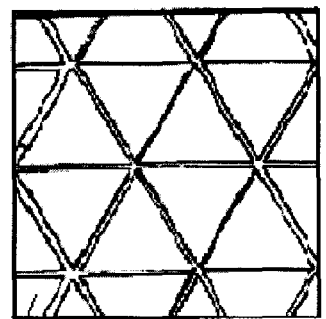
100 Fig. 11e
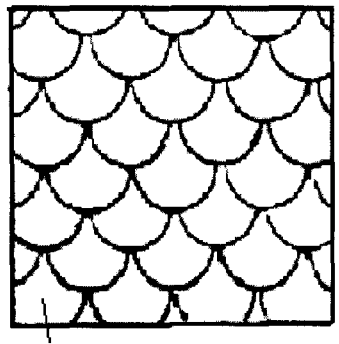
94 Fig. 11b
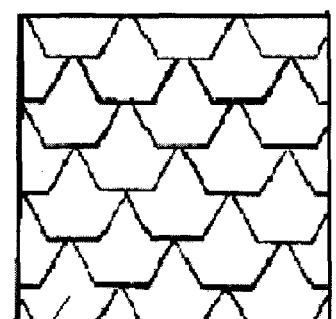
98 Fig. 11d
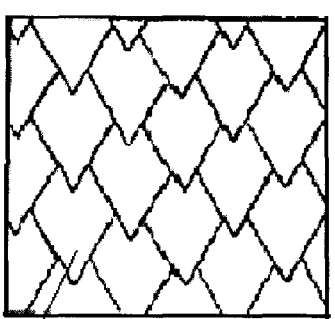
102 Fig. 11f

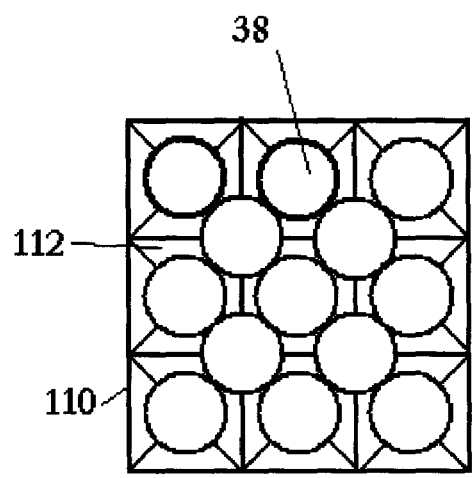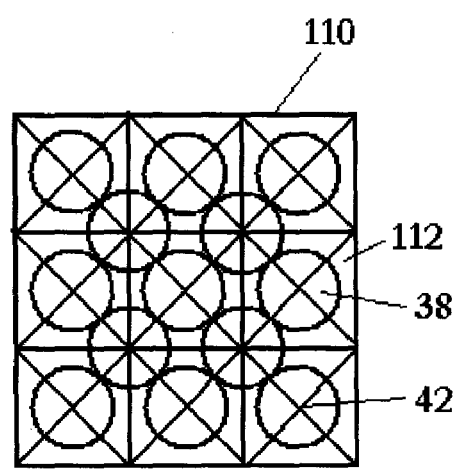
Fig. 16a    Fig. 16b
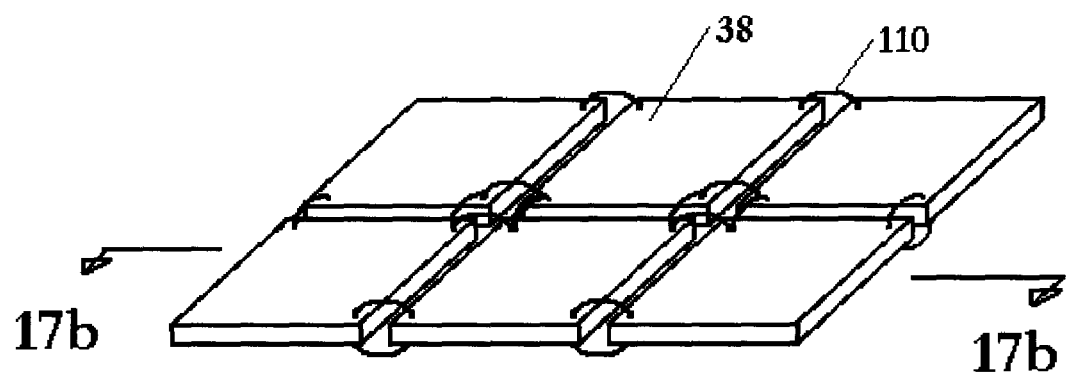
Fig. 17a
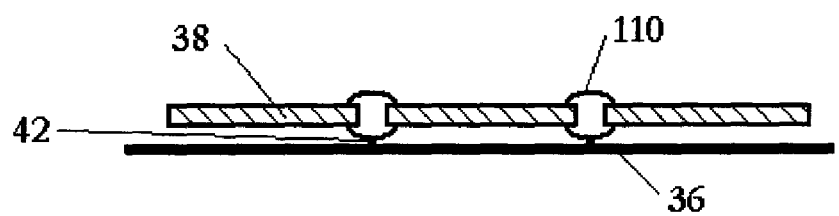
Fig. 17b

PUNCTURE AND CUT RESISTANT MATERIAL

RELATED APPLICATIONS

This application claims the benefit of provisional patent application No. 60/766,291 filed Jan. 9, 2006 by the present inventor.

This application claims the benefit of provisional patent application No. 60/823,369 filed Aug. 23, 2006 by the present inventor.

This application claims the benefit of international application no. PCT/US2006/062525 filed Dec. 12, 2006 by the present inventor.

FIELD OF INVENTION

This invention relates to cut and puncture resistant materials for garments. This invention is intended for use with wetsuits (like neoprene or nylon) for water activities, but said invention may prove useful wherever puncture and cut resistant material that is also elastic is used.

BACKGROUND

There are currently numerous "wet" suits worn by water sports enthusiasts. Some are made of elastic materials like nylon to reduce the body's natural "drag" against the water, such as used by Olympic swimmers. Others are made of elastic materials like nylon by surfers for the purpose of providing a thin level of rash protection from contact with the surfing equipment. Some are made from insulating materials like neoprene which provide thermal insulation for those participating in colder waters.

In order for these garments to work effectively, they must stretch and cling to the wearer. In order for these garments to be desired by enthusiasts (and actually be worn) they must allow for a high level of mobility, which again requires a high level of stretch and elasticity.

Current wetsuits do provide for simple rash protection or thermal insulation, but are not designed to resist puncture, cutting, or tearing, such as may be received from impacts with sharp rocks or reefs, or from shark bites. Many fatalities from shark bites result not from blunt force trauma or drowning induced by the shark, but rather from the deep puncture and cutting of tissue from the shark's razor sharp teeth. Some dive shops do offer chain mail garments designed to be worn over wetsuits or rash guards. These garments function when engaged in slow deliberate movements like SCUBA diving. However, these suits are too oversized, bulky, heavy, and burdensome for those participating in vigorous water sports like swimming or surfing.

So, manufacturers of wet suits for vigorous water sports have long sought a means to effectively protect the wearer from cutting, puncture, and tearing in a garment that remains highly elastic and form fitting.

There are essentially four "groups" of related art that should be discussed in detail. The first group of references is related to wet suits or thermal suits for diving, which do not significantly protect the wearer from cutting or puncture. The second group of references is related to suits or materials with small rigid elements or platelets designed for protection from fire, knife stabbing, or high velocity punctures (such as bullets). These materials are generally not designed to expand and contract, as such a property would be deleterious to their intended use (by allowing gaps between individual platelets to form during expansion of the base material, which may defeat the protection altogether). The third group is references contain materials designed primarily for the medical profession, in the form of gloves and various materials, to prevent accidental needle sticks and scalpel cuts. These materials are generally not intended for full suits or for vigorous water activities. The fourth group of references is related to suits or materials specifically for shark bite protection, with materials ranging from chain mail to spiked outfits. All of the groups of referenced related art have serious limitations for use, which explains why they are not used by water sports enthusiasts currently.

Group one depicts thermal protection suits that do not possess significant cutting or puncture resistance. U.S. Pat. Nos. 2,749,551 and 2,981,954, issued to Garbellano, depict such underwater thermal suits. Garbellano's suits are designed primarily for thermal insulation, and do not possess significant cutting or tearing resistance other than that afforded by the neoprene and fabric itself. U.S. Pat. No. 4,710,978, issued to Pankopf, discloses a protective garment for water activities. The suit is designed for ease of wearing, not to protect against biting or cutting. U.S. Pat. No. 6,519,774, issued to Mitchell, discloses a scuba wet suit with constant buoyancy. It includes a plurality of rigid-wall containers, supported by at least one support layer, which are designed to provide insulation and buoyancy. These containers, and their support layer(s), do not provide protection against shark bites or reefs. U.S. Pat. No. 5,660,572, issued to Buck, discloses a floatation fabric and life preserver made therefrom. The floatation fabric is composed of two opposed layers of water-permeable, flexible, woven or knitted material. Sandwiched between the layers are small particles, pellets or beats of closed cell foam plastic material, which give the fabric its buoyancy. Buck's patent is designed for floatation, not for shark attack prevention.

Group two depicts suits or materials designed for knife stabbing or high velocity bullet protection. U.S. Pat. No. 3,398,406, issued to Waterbury, is designed to be buoyant and to repel bullets. The material from which to construct the suit, however, is not well-defined (cellular plastic with submicron metallic particles at the molecular level), and the suit would appear to have limited flexibility and expansive characteristics due to a base of semi-rigid plastic. U.S. Pat. No. 2,819,759, issued to Goodloe; U.S. Pat. No. 3,813,281, issued to Burgess, et al; and U.S. Pat. No. 5,515,541, issued to Sacks and Jones, suggest plates affixed to a flexible, yet preferably non-elastic base. The non-elastic nature of the base material provides for flexibility but eliminates the clinging elastic properties required for vigorous water sports. Finally, U.S. Pat. No. 5,511,241, issued to Zieglar, depicts a chain mail glove impregnated with neoprene. Infusing flexible metal with rubber renders the composite material substantially inflexible and inelastic, because the elastic neoprene material would bond to virtually all of the steel ring surfaces. All of these referenced suits or materials seem to possess a significant degree of flexibility, but lack a significant level of elasticity.

The third group features many designs of materials and garments designed to protect the skin, especially professionals in the medical field from accidental needle sticks or scalpel cuts. These materials are not generally intended for complete suits or for use in the water. The arrays of tiny platelets in U.S. Pat. No. 4,951,689, issued to Jones; U.S. Pat. No. 5,200,263, issued to Gould and Nichols; U.S. Pat. No. 5,368,930, issued to Samples; U.S. Pat. No. 5,601,895, issued to Cunningham; U.S. Pat. No. 5,953,751, issued to Kobren; and U.S. Pat. No. 6,519,774, issued to Kim, are small and smooth faced. Teeth from a shaking shark bite would likely slide over the smooth faced platelets and find their way in between them. The woven metals or woven aramid fibers of U.S. Pat. Nos. 4,779,290 and 4,833,733, issued to Welch and Dombrowski; U.S. Pat. No. 4,742,578, issued to Seid; and U.S. Pat. No. 5,070,540, issued to Bettcher and Bettcher, are flexible, but inelastic, and would prevent high degrees of elasticity and mobility required by water sports enthusiasts. U.S. Pat. No. 4,526,828, issued to Fogt, et al, discloses a protective, cut-resistant material for use in articles of apparel. Such material, however, would not guard against shark bites.

The final group discloses suits specifically designed for protection while engaged in water activities. U.S. Pat. No. 3,284,806, issued to Prasser, depicts a thermal rubber wetsuit with impregnated steel mesh or a plurality of "intermeshed" rings to form an "interlinked fabric." This design is similar in limitations to Ziegler, wherein the infusing of flexible metal with rubber renders the composite material as substantially less flexible and inelastic. This is because the elastic neoprene material would bond to virtually all of the inelastic steel surfaces. U.S. Pat. No. 4,356,569, issued to Sullivan, suggests chain mail with large steel plates. This suit is limited by non-clinging or form-fitting steel chain mail, with plates of steel strapped to the outside. This entire arrangement would be very difficult to efficiently maneuver through the water. Further, this arrangement would be prohibitively expensive and cumbersome to manufacture in requiring tailoring to the many different sizes and shapes of people. U.S. Pat. No. 4,602,384, issued to Schneider, and U.S. Pat. No. 4,833,729, issued to Fox, both suggest elements on the outside of the suits (spikes or repulsive chemical sacs) to deter shark attacks. Due to gear entanglement issues and the outrageous appearance of the suits, neither product would likely be considered by someone involved in vigorous water sports. French Patent No. 2819151, issued to Daniel and Olivier, discloses a protective suit. It does not however solve critical issues whereby an extensive cross section of surface area is connected from protective elements to the elastic elements, which renders that same cross section of elastic material as inelastic, does not provide adequate protection when the elastic material is elongated, the protective elements are defined as non-deformable bands (i.e. rigid, which creates a much less flexible and pliable composite material) and finally the protective layers are externally exposed, which allows these layers to both snag on equipment and create significant water drag.

In conclusion, the present invention seeks to remedy the following several critical problems in the referenced patents:
(a) They attempt 100% solutions to a protection problem, providing so much protection that ultimate mobility and manufacturing costs are compromised. This results in garments that are not either not purchased or not worn.
(b) Some suits offer only thermal or rash protection, and offer little to no protection from cuts or punctures such as may be imposed by a shark bite or a sharp rock or reef.
(c) The referenced platelet designs have problems in that: 1) they are mounted to bases that are flexible but preferred as non elastic, which prevents both the clinging form fitting nature and high degrees of mobility and 2) they propose small, rigid, smooth faced individual plates, which would not prevent teeth in a shaking shark bite to slide in between platelets.
(d) The chainmail, chainmail and metal plate, neoprene infused chainmail, and steel mesh designs are limited in that they are 1) heavy, 2) expensive to manufacture, and 3) they do not allow free expansion and contraction (they are limited to the designed expansion of the interconnected metal elements of the chainmail or steel mesh).
Currently available chainmail suits for water activities are manufactured oversized to allow donning and doffing. The excess material is bound up with additional straps and rubber bands (creating significant water drag). These suits are generally acceptable for slow deliberate movements like scuba diving, but impractical for vigorous sports like surfing or swimming.
(e) The spike and chemical sac suits both suffer from an expensive manufacture process, likely entanglements of other gear or equipment (like scuba gear), imposed difficulty in the wearer's movement (swimming, surfing, etc.), large amounts of drag when moving through the water, and an appearance that would discourage use by water sports enthusiasts.

SUMMARY OF THE INVENTION

Accordingly, several objectives and advantages of the present invention are:

To provide a material to comprise a garment, that protects the wearer from cuts, punctures, and tears (such as may be imposed by a shark bite, impact with a reef, or a sharp rock).

To provide a material to comprise a garment, that expands and contracts to the limit of the elastic base material, and not to the limit of interconnected protective elements as in other garments. This is achieved by both specifically not interconnecting protective element(s), and limiting or eliminating the direct connective surface area between the protective element and the elastic base material(s). In comparison, typical chain mail can only expand to the limit of the extended interconnected rings.

To provide a material to comprise a garment, that while protecting the wearer, it also expands and contracts. This elastic nature which clings to the wearers contours is critical to 1) provide for easy donning and doffing, 2) provide for ease of mobility and freedom of movement of the wearer, 3) allow for potential thermal benefit if desired, 4) minimize water drag and 5) minimize gear entanglements (like scuba gear).

To provide a material to comprise a garment that, while protecting the wearer and allowing free movement, does not appear very different than other garments commonly worn today (like common surfing or diving wetsuits). This allows the wearer to feel comfortable around peers engaged in similar activities, as the proposed garment does not have an outrageous appearance (like the chain mail or spiked outfits).

To provide a material to comprise a garment that, while protecting the wearer and allowing free movement, is relatively inexpensive to manufacture in materials and fabrication processes. This is achieved by using standard size and spacing of protective elements (mass produced), affixed to common elastic materials (like neoprene and nylon), with simple single point attachment like button sewing or rivets. The protective elements themselves can be made from laminated high strength cloth (i.e., laminated aramid fiber cloth), which is already manufactured and commonly used in sail boat sails.

In accordance with the present invention is a material to form a garment, comprised of small (preferably flexible) protective elements, which are not connected or linked directly to each other, but rather are linked only to a flexible and highly expansive and contractive (elastic) base material. There should be minimal or no connective surface area between the elastic base material and the individual protective elements, like single point button stitching, or minimal connection of elastic thread material between the various platelets. This allows the base material to freely expand and contract to the limit of the base material, instead of being restricted to the limit of interconnected less-elastic protective elements. Covering the protective element(s) with additional layers of expansive material is preferred to create a garment that appears similar to other popular garments currently worn, to reduce water drag, and to prevent snagging of exposed protective element(s) on gear, rocks, etc.

BRIEF DESCRIPTION OF DRAWINGS

In the drawing figures, closely related figures have the same number but different alphabetic suffixes.

FIG. 5a depicts a cross section of the material in cross section in a relaxed state. FIG. 5b shows the same cross section in an expanded state.

FIG. 6a depicts a single shark tooth in initial contact with the protective materials, with a representation of the tooth point's surface area.

FIG. 6b depicts a single shark tooth depressed halfway into the material with flexible protective elements yielding to the form of the tooth. There is also representation of the linear area of surface contact between the tooth and the protective layer.

FIGS. 7a and 7b depict a shark tooth with serrations reacting to the high strength fibers of the protective element. FIG. 7b depicts a magnified view of the serrations catching on the threads of the high-strength fibers.

FIG. 9a depicts a rigid protective element platelet design with a jagged surface. FIG. 9b depicts this same platelet in cross section. FIG. 9c depicts an alternate rigid platelet design with hole perforations, and FIG. 9d depicts this same platelet in cross section.

FIG. 10a depicts the operation of rigid smooth-faced platelets in contact with a shark's tooth under the operation of a bite (downward pressure and side-to-side shaking). FIG. 10b depicts a jagged surface of a rigid platelet capturing the tooth during side-to-side shaking.

FIGS. 11a through 11f depict multiple arrangements of protective element shapes, both in overlapping and non-overlapping arrangements.

FIGS. 16a and 16b depict an alternative embodiment of protective elements connected by a plurality of material, such as an elastic thread, or the like.

FIGS. 17a and 17b depict an alternative embodiment of protective platelets with their edges connected by material, such as an elastic thread, or the like, in perspective view and sectional view, respectively.

DRAWINGS

Reference Numerals

Figure 1:
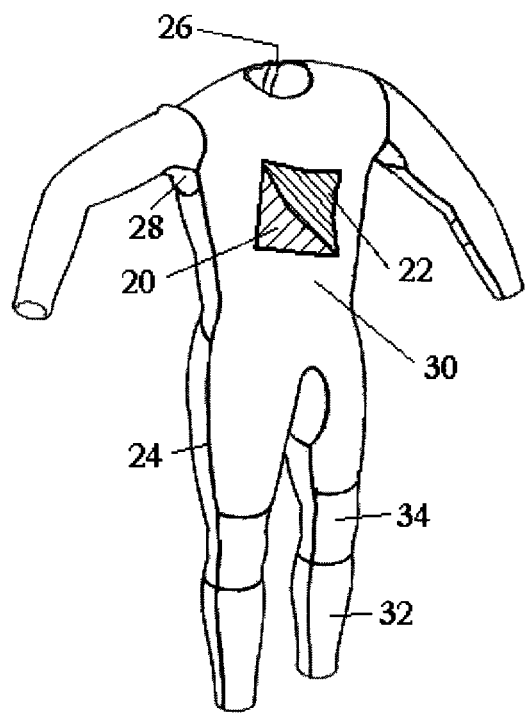
FIG. 1 depicts a complete wet suit garment made from the composite protective material, with a flap exposing the protective layer underneath a layer of elastic cover material.

20 Layer of protective elements
22 Layer of elastic cover
24 Elastic seaming (stitching etc.)
26 Zipper opening
28 Minimal protective elements
30 Area of large size platelets
32 Area of medium size platelets
34 Area of small sized platelets
36 Elastic layer
38 Protective element (Platelet)
40 Elastic base layer
42 Point connection (i.e., stitch)
50 Connection through all layers
52 Continuous bond (i.e., glue)
54 Dimension of elastic area
56 Dimension of non-elastic area
60 Knitted cloth protective elem.
62 Expansive stitching
64 Protective layer
66 Shark Tooth
68 Surface area of tooth point
70 Surface area of tooth edge
71 Individual tooth serration
72 Layer of plastic film
80 Layer of strong woven fabric
82 Rigid protective platelet
84 Jagged Surface
86 Hole perforation
90 Smooth Surface
92 Round platelet
94 Overlapped round platelet
96 Hexagonal platelet
98 Overlapped hexagonal platelet
100 Triangular platelet
102 Overlapped triangular platelet
104 "Z" shape overlap platelet
106 Flat overlapping platelet
108 "Pocket"-continuous attachment
110 Attachment Material (e.g., elastic thread)
112 Open area

DETAILED DESCRIPTION OF DRAWINGS

In the following detailed description of various embodiments of the invention, numerous specific details are set forth in order to provide a thorough understanding of various aspects of one or more embodiments of the invention. However, one or more embodiments of the invention may be practiced without many of these specific details. In other instances, well-known methods, procedures, and/or components have not been described in detail so as not to unnecessarily obscure novel aspects of the various embodiments of the invention.

FIG. 1 depicts a complete wet suit garment made from the composite protective material with a flap exposing the protective layer 20 underneath a layer of elastic cover material 22. The elastic material is preferably neoprene or a thin nylon elastic fabric, depending on the desired thermal properties. Essentially, any elastic material either in fabric or sheets could be used for layer(s) of the material, such as rubber, nylon, silicone, etc. There is a typical closeable opening 26 (i.e., zipper, hook and eye, etc.), expansive connections (i.e., stitching, heat fusing, glue, tape, etc.) at the panel seams 24, and the potential for panels for different sized protective element(s) within. Large sized protective elements (i.e., 3" diameter round platelets) could be used in torso and back areas 30, medium sized protective elements (i.e., 1½" diameter round platelets) could be used in arm and leg areas 32, and small sized protective elements (i.e., ¾" diameter round platelets) could be used in high mobility areas like elbows and knees 34. Areas of contact and chaffing 28, like arm pits and groin, could have no protective element. The elastic cover layer 22 is preferred to render the complete garment as close in appearance to existing garments as possible, to reduce water drag on exposed protective elements, and to prevent snagging between the individual protective elements and gear (i.e., scuba gear).

Figure 2:
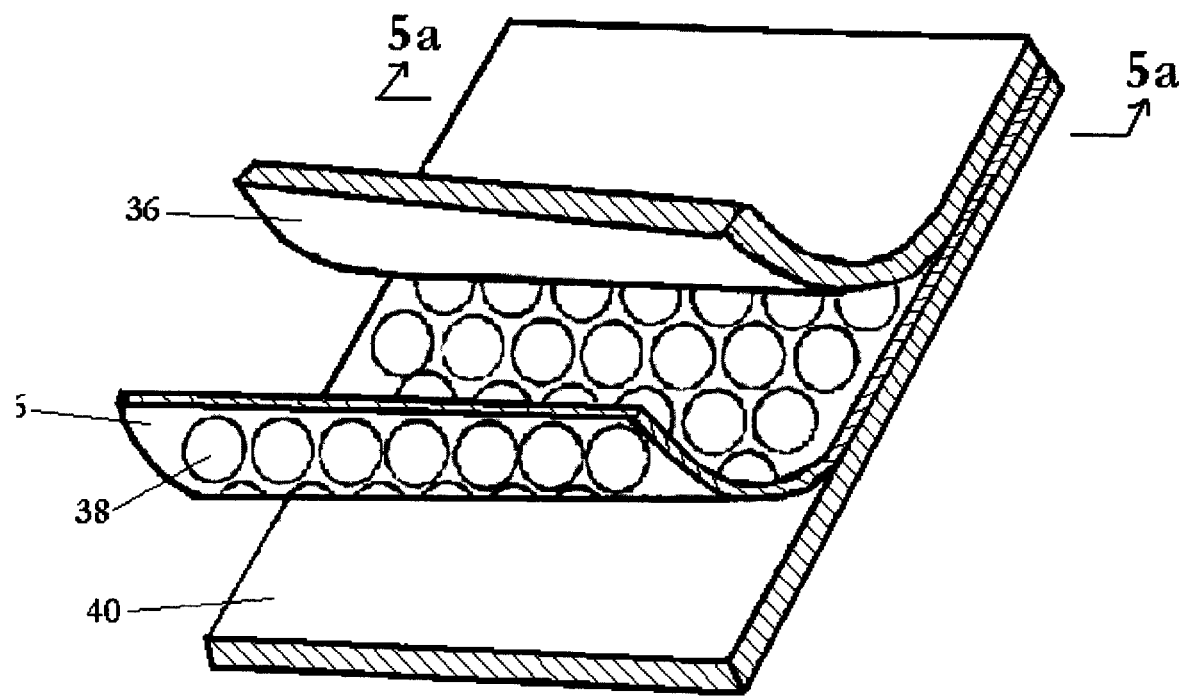
FIG. 2 shows the material in a perspective view with layers pulled up to expose the layers beneath. There is a layer of expandable base material, a layer of elastic material to attach the offset protective elements on either side, and an exterior layer of elastic material to cover the platelets.

FIG. 2 shows a piece of the material in a perspective view with layers pulled up to expose the elastic layers and protective elements within. There is one layer of expandable base material 40, a layer of elastic material 36 to attach the protective elements 38 on either side, and an additional exterior layer of elastic material 36 to cover the protective elements 38.

Figure 3A:
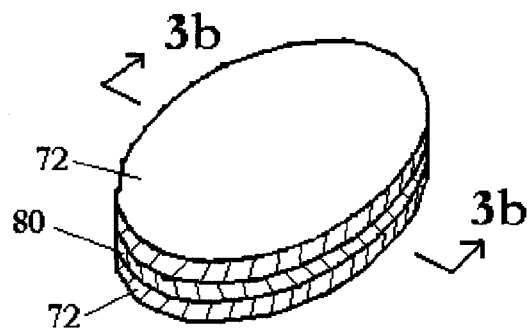
FIG. 3a depicts the preferred embodiment of a flexible protective element platelet comprised of a layer of high strength material (nylon web, aramid cloth, steel mesh, etc.) heat and pressure fused between two outside layers of plastic (i.e., polyethylene terephthalate [PET] or Mylar).
Figure 3C:
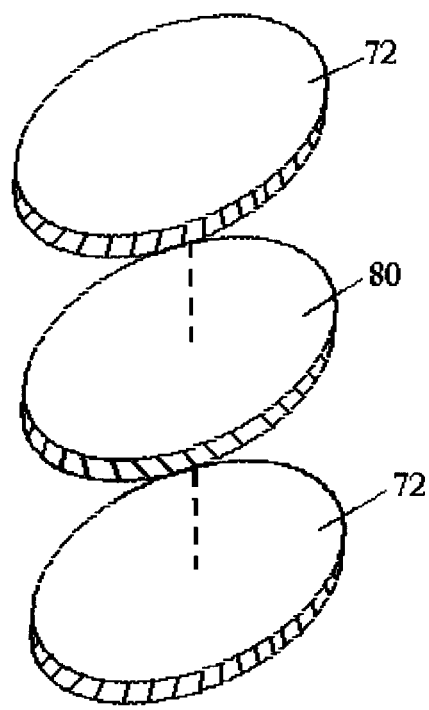
FIG. 3c is an exploded view.
Figure 3B:
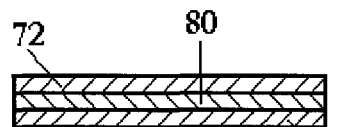
FIG. 3b depicts this platelet in cross section.

FIG. 3a depicts the preferred embodiment of an individual protective element, comprised of a layer of high-strength, fiber cloth 80, attached (glued, heat fused, etc.) between two outside layers of plastic 72 such as polyethylene terephthalate (PET). FIG. 3b depicts this same platelet in cross section, and FIG. 3c is an exploded view. The critical purpose of the outside layers of plastic is to keep the high strength material flat and expanded in whatever shape it is (i.e., circular), so that it will not roll up or fold between the layers of the elastic base and covering when those layers are expanding and contracting. Also, the plastic serves to keep the edges of high strength (cloth) materials from unraveling.

Figure 4A:
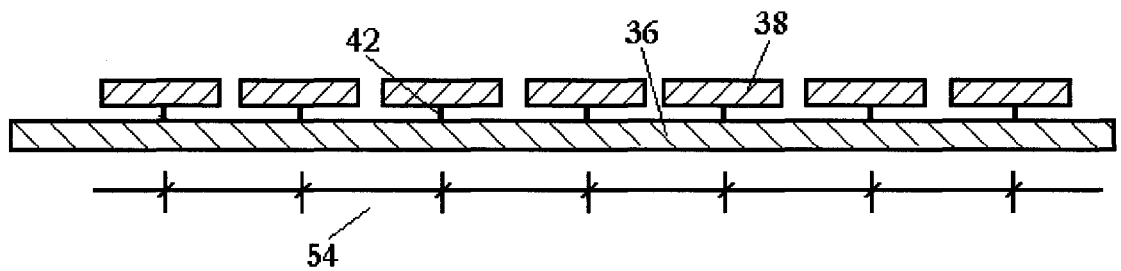
FIG. 4a depicts individual non-expansive protective element platelets point-attached to the elastic base material, with dimension lines showing the amount of elastic area in a linear format.

FIG. 4a depicts the individual, non-expansive, protective elements 38 point-attached 42 to the elastic base material 36, with dimension lines showing the amount of relative elastic area 54 in a linear format. The point-attachment 42 allows for virtually all of the linear area of the elastic material 36 to remain elastic.

Figure 4B:
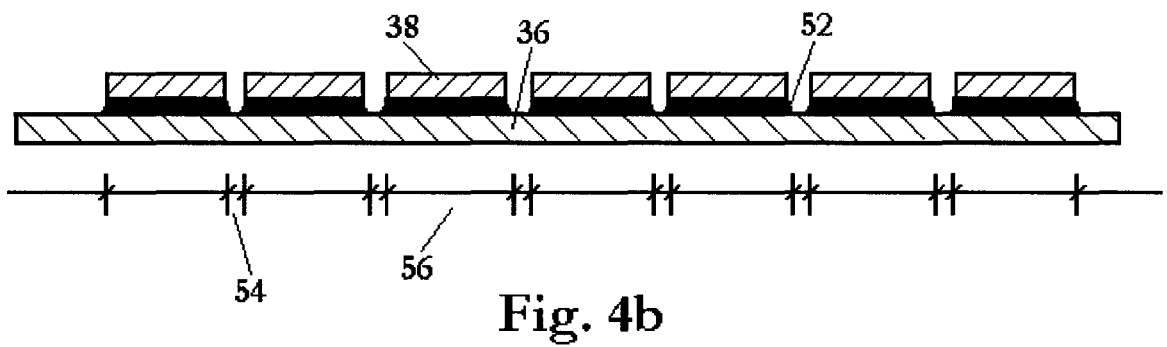
FIG. 4b depicts the same line of platelets with continuous attachment to the elastic base (not part of the invention). This figure also depicts the linear area remaining that is still elastic.

FIG. 4b (shown only for reference, not part of this invention) depicts the same line of protective elements 38 with continuous attachment 52 to the elastic base 36. This figure also depicts the linear area remaining that is still elastic 54, and also shows the extensive area that is rendered as non-elastic 56 due to its continuous connection 52 to a non-elastic protective element 38. The sum total of elastic area 54 in FIG. 4a is substantially larger than the sum total of elastic area 54 in FIG. 4b. In FIG. 4a, the point-connectivity between the elastic base 36 and protective element 38 renders a mostly elastic surface. The protective portion 38 of the inelastic layer 56 reduces the elasticity of the surrounding areas in FIG. 4b.

FIG. 5a depicts this same material in cross section in a relaxed state. Three layers of elastic material 36 surround two layers of protective platelets 38. The protective element 38 layers are offset to one another to provide greater protection through the section. The protective elements 38 are point-attached 42 (i.e., button stitch, glue, rivet, etc.) to the elastic layers. The point-attachment minimizes the area of connectivity between the layers, leading to greater elasticity.

FIG. 5b shows the same cross section in an expanded, stretched state. Even though the elastic materials 36 have expanded, the protective elements 38 have not expanded, nor have the protective elements 38 limited the expansion of the base materials 36, due to the point only attachment. Also, with the protective element 38 layers offset to one another, one layer of protective elements will cover the gaps opened by the other layer of protective elements during expansion. It is also possible to connect all the layers together via a connection attachment 50 (i.e., stitch, glue, rivet, etc.) without limiting the elasticity of the composite material. This helps create a consistent and interrelated composite material.

FIG. 6a depicts a single shark tooth 66 in initial contact with the protective materials 64, with a representation of the tooth point's surface area 68. The area of impact 68 in FIG. 6a is extremely small. Therefore, if the pressure of the bite were 60 pounds per square inch (PSI) with a single tooth, and the point of the tooth is $\frac{1}{30}^{th}$ of an inch, the relative puncture pressure on the small area of the protective element would be 1,800 PSI.

FIG. 6b depicts a flexible protective element 64 yielding to the shape of the shark tooth 66, dramatically increasing the surface area between a single tooth 66 and the protective element 64. As the surface area of contact 70 with the tooth 66 increases, the relative puncture pressure on the protective element dramatically decreases. If the surface area 70 represented in FIG. 6b were $\frac{1}{6}^{th}$ of an inch, the same 60 PSI bite would yield a relative puncture pressure of a single tooth at 360 PSI, across the larger surface area.

FIG. 7a depicts a shark tooth 66 with serrations 71 reacting to the high-strength fibers 80 of the protective element 64. The serrated nature of the tooth snagging on the fibers 80 has not only prevented the tooth from puncturing through the material 64, it has also prevented the tooth from sliding back and forth on the surface of the material 64, keeping it from pressing in between protective elements or slicing their surface.

FIG. 7b depicts a magnified view of the serrations 71 catching on the fibers of the high strength material 80.

FIG. 9a depicts an alternative embodiment of a (semi) rigid protective element 82. These (semi) rigid protective elements may be desired to limit blunt force trauma for certain garments. It is critical that these protective elements have some sort of jagged, perforated, "snagging" material on the surface of the rigid protective element (like hook and eye, wire mesh, softer material, etc.) or other non-smooth surface 84 to prevent a sliding action of the tooth. A typical shark bite includes a downward pressure, as well as shaking from side to side. If teeth are allowed to slide over protective element faces, they will find their way in between protective elements (shown in FIG. 10a below).

FIG. 9b depicts this same protective element 82 in cross section depicting the irregular surface of the design.

FIG. 9c depicts an alternative embodiment of a rigid, protective element platelet 82 with hole-shaped perforations 86.

FIG. 9d depicts this same protective element platelet 82 in cross section.

FIG. 10a (not part of this invention, shown for reference) depicts the operation of rigid protective element platelets 82 with smooth surfaces 90 in contact with a shark's tooth under the operation of a typical bite (downward pressure and side to side shaking). This figure illustrates that the tooth can slide over the surface of the protective element platelet, finding its way between two protective element platelets, thus defeating the protective qualities of the platelets.

FIG. 10b depicts an irregular surface 84 of a rigid protective element platelet 82 "capturing" the tooth point during side to side shaking, thus preventing it from simply sliding in between protective elements.

FIGS. 11a through 11f depict various geometric patterns of protective element platelets in exposed and overlapping configurations, which can be utilized for style or ease of manufacturing. The actual shape of the protective element platelets could be in many different forms or variations. FIG. 11a depicts the surface of material with round protective element platelets 92, FIG. 11b with round overlapping protective element platelets 94. FIG. 11c depicts the surface of material with hexagonal protective element platelets 96, FIG. 11d with overlapping hexagonal protective element platelets 98. FIG. 11e depicts the surface of material with triangular protective element platelets 100, FIG. 11f with overlapping triangular protective element platelets 102.

Figure 12A:
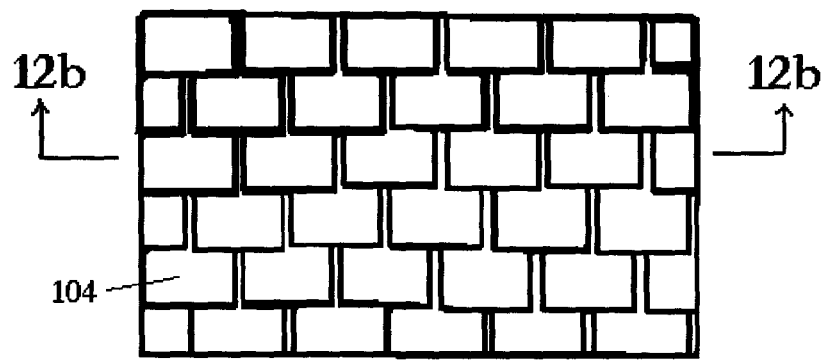
FIG. 12a depicts a "Z"-shaped, protective-element platelet that overlaps other platelets, thus allowing for expansion and contraction without opening gaps in the system.

FIG. 12a depicts an alternative embodiment of protective element platelets, in rectangular "Z"-shaped, protective element platelets 104 that overlap other protective element platelets 104, thus allowing for expansion and contraction without opening gaps in the system.

Figure 12B:
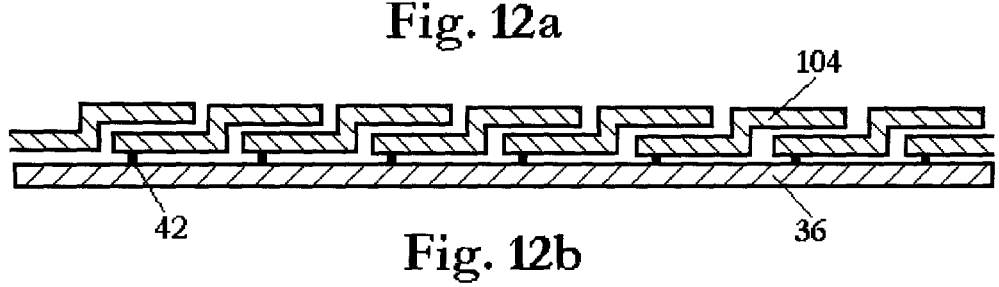
FIG. 12b depicts the same arrangement in cross section.

FIG. 12b depicts the same arrangement of rectangular "Z" shaped protective element platelets 104 that overlap one another in a flat plane, affixed with point connections 42, to an elastic base 36, in cross section.

Figure 13A:
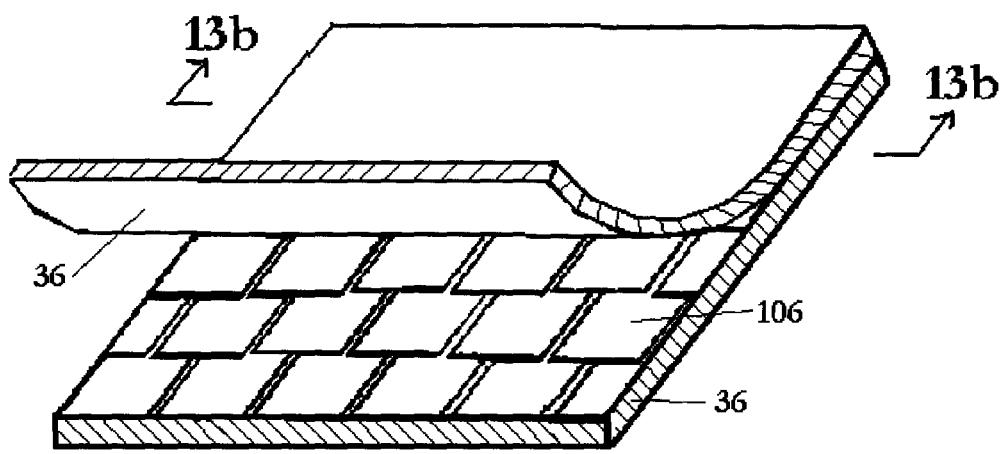
FIG. 13a depicts a perspective view of flat, overlapped, protective-element platelets in a rectangular shape.
Figure 13B:
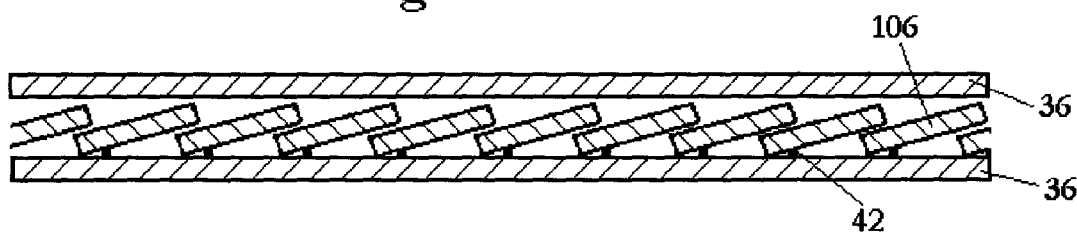
FIG. 13b depicts a cross section of this same material.

FIG. 13a depicts an alternative embodiment, in a perspective view of flat, overlapped protective element platelets 106 in a rectangular shape, affixed to layers of elastic materials 36. FIG. 13b depicts a cross section of this same material of flat overlapped protective element platelets 106, affixed to layers of elastic materials 36 with point connections 42.

Figure 14A:
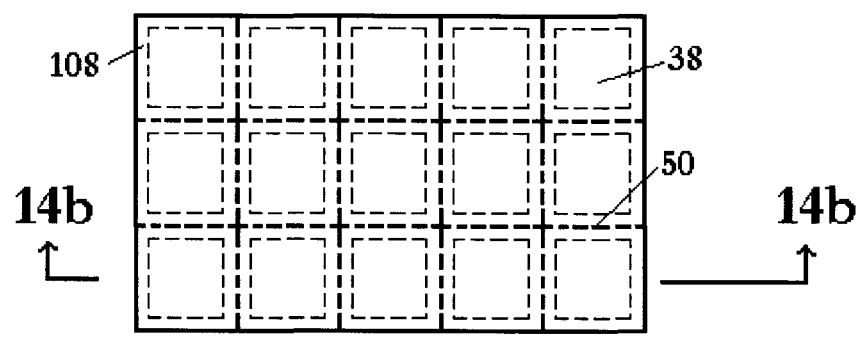
FIG. 14a depicts a "pocket"-type arrangement where the protective-element platelets are not attached in any way to the elastic covering materials. Rather, the exterior elastic layers are connected to form pockets to hold the platelets inside the pockets.
Figure 14B:
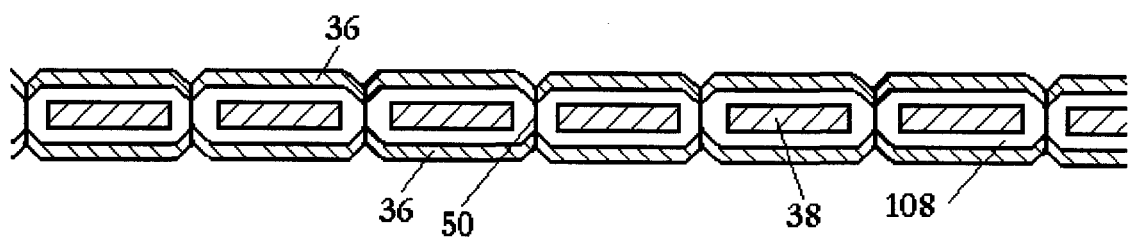
FIG. 14b depicts a cross section of this same material.

FIG. 14a depicts an alternative embodiment where the elastic materials 36 are connected together 50 in such a fashion as to create "pockets" 108 to hold the protective element platelets 38 within the pockets 108, in relative position to each other across the plane of elastic material. In this embodiment there is no direct attachment whatsoever from the protective element platelets 38 to the elastic material 36.

Figure 15:
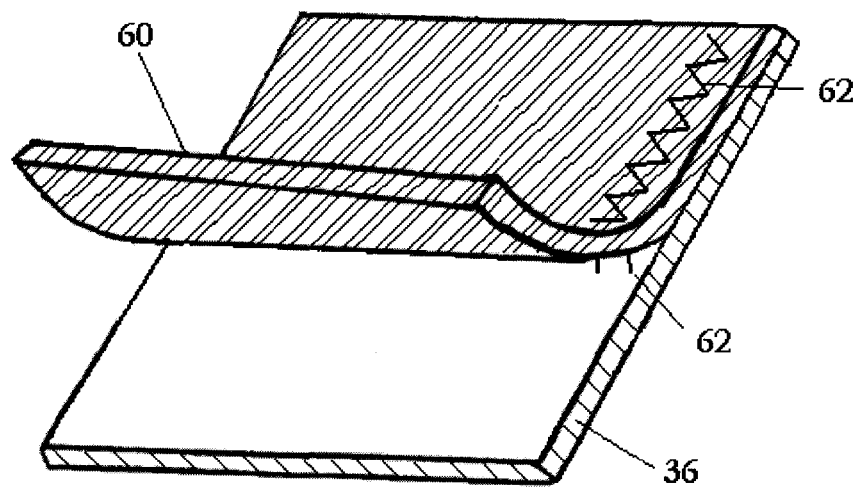
FIG. 15 depicts an alternative embodiment of the protective element as a panel of knitted, high-strength, fiber cloth joined only at panel seams to a layer of elastic base material.

FIG. 15 depicts an alternative embodiment of the protective material with a large protective element of knitted high strength material, like knitted aramid fibers 60 and a layer of elastic base material 36, connected together only at panel seams with an elastic attachment 62 (i.e., stitching, glue, fusing, etc.). This embodiment also minimizes connective area between the elastic material and the protective element, by only connecting the materials at the panel seams 62.

FIG. 16a depicts a frontal view of an alternative embodiment of platelets 38, connected via a plurality of individual elastic threads 110 to the elastic material 112.

FIG. 16b depicts a rear view of an alternate embodiment of platelets 38 connected via individual elastic threads 110 to the elastic material 112.

FIG. 17a depicts a perspective view of an alternative embodiment of platelets 38 with elastic connections 110 at the outside edge of the platelets.

FIG. 17b depicts a section of this arrangement of protective platelets 38 with elastic connections 110 at the perimeter edges, and an optional layer(s) of a covering or underlying material 36 with an elastic attachment 42 (i.e., stitching, glue, fusing, etc.).

From the description above, a number of advantages of the puncture and cut resistant material become evident.

This material is comfortable. It is specifically designed to be both elastic, form fitting, and light weight. A completed garment will act much like currently available elastic nylon garments or elastic neoprene garments, which means it has a high probability of actually being worn. The clinging fit reduces water drag, eliminates snagging of equipment, and allows it to worn as an undergarment. This ease of mobility would be highly sought after by water sports enthusiasts, law enforcement, military operations, etc.

The material is easy to manufacture. Assembly of the material is executed with standard garment industry methods. The preferred embodiment of the material is layers of elastic nylon or neoprene, with multiple layers of high strength laminated protective elements in between. The protective elements can be made from laminating high strength cloth (i.e., aramid fiber cloth, etc.). Aramid fibers have a longstanding reputation for protection, and laminated aramid fibers have been used for decades in racing sails for boats, proving the composite protective element material's longevity. The composite layered material can be simply sewn together, or attached by any number of methods including fusing, gluing, tapes, etc. If (semi) rigid protective elements are desired, they can be attached with button-stitching, rivets, or any number of other techniques.

The elastic nature of the material eliminates the need for precise tailoring to individuals. This means a certain size garment would fit a large percentage of the population, reducing costs to manufacture and distribute the garments. This same elastic nature also allows for ease of donning of the garment, in not requiring numerous holes and closures. This further simplifies the manufacturing process of garments.

The completed material and garments look substantially like currently available garments. Wetsuits, rash guards, elastic nylon sport wear, etc. all appear substantially the same as the protective material. This means this protective material is likely to actually be purchased and worn. Other protective products like chain mail diving garments have an appearance not likely to be utilized by surfers or swimmers.

This material lends itself to various applications. Protective elements can be thin and flexible for small shark bite protection, or the protective elements could be (semi) rigid and/or thicker for ballistic or stab protection. The elastic layers could be thin nylon for warm water, or neoprene for cold water, and there can be any number of layers. Any number of combinations are possible to fit the perceived threat or conditions. The various possible configurations of this material allow it to be adapted for water activities, law enforcement, military, etc.

Accordingly, the puncture and cut resistant material is a substantial improvement from currently available technology. The material can be used in a number of applications, but would prove especially useful in relation to water activities. The material of this invention is designed to provide relatively free expansion and contraction, while also providing for protection from punctures, cutting, tearing, etc., via a plurality of protective element(s). Furthermore, the puncture and cut resistant material has additional advantages in that:

1) the material's construction permits the wearer to move freely and vigorously, while maintaining a substantial level of protection;
2) the material's smooth exterior surface reduces water drag, and prevents snagging on gear or outerwear;

3) the material allows for a relatively simple manufacturing process in that existing fabrics and existing laminated high strength fibers are combined with simple stitching or other fabric joining methods;
4) the material's elastic properties allow for garments to stretch to fit the wearer, thus eliminating the need for custom tailoring or numerous openings and closures to properly fit a wide range of different wearers;
5) its finished appearance is substantially the same as other materials currently used in garments, allowing users to wear the improved garments with being subjected to an unpleasing appearance;
6) the material's construction allows for a wide range of application, utilizing a few layers of protective elements or many, utilizing thin flexible protective elements or thicker (semi) rigid protective elements, thus being adaptable to various perceived threats or conditions.

Although the description above contains much specificity, the specific details provided should not be construed as limiting the scope of the invention, but as merely providing illustrations of some of the presently preferred embodiments of this invention. For example, the elastic materials could be many different materials, thicknesses, configurations, weaves, knits, etc. The protective elements can be made from flexible high strength materials like aramid fibers, nylon fibers, steel mesh, plastic (i.e., high density polyethylene etc.), etc., or from (semi) rigid materials like steel, aluminum, plastic (thicker layers), etc. The protective elements can also be made from any number of composite assemblies, like carbon fiber, laminated aramid cloth, rubber infused with steel mesh, etc. The minimal attachment of the protective elements can be accomplished by button stitching, rivets, pocket sewing, panel sewing, adhesive, etc. Finally, the assembly of the material can be from any number of layers of elastic materials, layers of protective elements, and various means to connect the layers (i.e., stitching, riveting, adhesives, heat fusing, tapes, etc.

Thus, the scope of the invention should be determined by the appended claims and their legal equivalents, rather than by the examples given.

What is claimed is:

1. A fabric assembly composite material, comprising:
   a layer of elastic material; and
   a plurality of protective elements attached to the layer of elastic material, each of said plurality of protective elements being attached to the layer of elastic material by a point attachment having an attachment surface area that attaches the layer of elastic material to each of said plurality of protective elements;
   wherein the layer of elastic material has an unattached surface area that is not attached to any of the plurality of protective elements and said unattached surface area is substantially larger than the attachment surface area that attaches the plurality of protective elements to the layer of elastic material; and
   wherein said plurality of protective elements covers substantially all of the layer of elastic material.

2. The fabric assembly of claim 1, wherein each of the plurality of protective elements is inelastic.

3. The fabric assembly of claim 1, further comprising:
   an exterior layer of elastic material that covers the plurality of protective elements so that the plurality of protective elements are held between the layer of elastic material and the exterior layer of elastic material.

4. The fabric assembly of claim 3, wherein the exterior layer of elastic material has a smooth exterior surface.

5. The fabric assembly of claim 3, further comprising:
   a base layer of elastic material in contact with the layer of elastic material such that the layer of elastic material is located between the base layer of elastic material and the exterior layer of elastic material.

6. The fabric assembly of claim 3, wherein the plurality of protective elements is attached to a first surface of the layer of elastic material adjacent the exterior layer of elastic material.

7. The fabric assembly of claim 6, further comprising:
   a second plurality of protective elements attached to a second surface of the layer of elastic material opposite the first surface, each of said second plurality of protective elements being attached to the second surface by a second layer point attachment such that virtually all of the second layer is free of the second layer point attachments of the second plurality of protective elements.

8. The fabric assembly of claim 7, wherein the point attachments of the plurality of protective elements are set off from the second layer point attachments of the second plurality of protective elements and the combination of the plurality of protective elements and the second plurality of protective elements cover all of the layer of elastic material.

9. The fabric assembly of claim 1, wherein each of the plurality of protective elements is comprised of a high-strength fiber cloth held between an inner and, an outer layer of inelastic material that prevents the high-strength fiber cloth from rolling up or folding.

10. The fabric assembly of claim 9, wherein the high-strength fiber cloth is comprised of an aramid fiber.

11. The fabric assembly of claim 1, wherein each of the plurality of protective elements has an outer surface layer with an irregular surface design.

12. The fabric assembly of claim 1, wherein the layer of elastic material is selected from the group consisting of neoprene and a nylon fabric.

13. The fabric assembly of claim 1, wherein virtually all of the layer of elastic material is contained in the unattached surface area and the layer of elastic material can freely expand and contract without substantial restriction caused by the attachment surface area that attaches the plurality of protective elements to the layer of elastic material.

14. The fabric assembly of claim 1, wherein the attachment surface area for each of said plurality of protective elements is substantially smaller than each of said plurality of protective elements.

15. The fabric assembly of claim 1, wherein each of said plurality of protective elements overlaps with at least one other of said plurality of protective elements.

16. The fabric assembly of claim 1, wherein each of said plurality of protective elements has a diameter of approximately ¾ of an inch or more.

17. A water garment for wearing over a torso of a person in a body of water, said water garment being comprised of a fabric assembly composite material having a layer of elastic material and a plurality of protective elements attached to the layer of elastic material, each of said plurality of protective elements being attached to the layer of elastic material by a point attachment, there being an attachment area between the layer of elastic material and each of said plurality of protective elements and an unattached surface area in which the layer of elastic material is not attached to any point attachment, wherein the attachment surface area for each of said plurality of protective elements is substantially smaller than each of said plurality of protective elements and the elastic material can freely expand and contract without substantial restriction caused by the attachment surface area that attaches the plurality of protective elements to the layer of elastic material.

18. The fabric assembly of claim 17, wherein virtually all of the layer of elastic material is comprised of the unattached surface area.

19. The fabric assembly of claim 18, wherein each of said plurality of protective elements overlaps with at least one other of said plurality of protective elements.

* * * * *